United States Patent [19]

Kazami et al.

[11] Patent Number: 4,670,693
[45] Date of Patent: Jun. 2, 1987

[54] CURRENT SUPPLY DEVICE FOR PLURAL LOADS

[75] Inventors: Kazuyuki Kazami; Toshiyuki Nakamura, both of Tokyo, Japan

[73] Assignee: Nippon Kogaku K. K., Tokyo, Japan

[21] Appl. No.: 744,520

[22] Filed: Jun. 14, 1985

[30] Foreign Application Priority Data

Jul. 2, 1984 [JP] Japan .................. 59-136993

[51] Int. Cl.⁴ ............................... H02P 7/68
[52] U.S. Cl. ..................... 318/112; 318/54; 354/173.1; 354/400
[58] Field of Search ............ 318/53, 54, 65, 93, 318/94, 95, 105, 111, 112, 113, 280, 287, 293; 354/173.1, 400

[56] References Cited

U.S. PATENT DOCUMENTS

| | | | |
|---|---|---|---|
| 3,526,818 | 9/1970 | Scheibel | 318/293 X |
| 4,296,361 | 10/1981 | Archer | 318/54 |
| 4,319,171 | 3/1982 | Motoori | 318/379 |

FOREIGN PATENT DOCUMENTS

| | | | |
|---|---|---|---|
| 58-163296 | 9/1983 | Japan | 318/111 |
| 0936338 | 6/1982 | U.S.S.R. | 318/112 |

*Primary Examiner*—Charles D. Miller
*Assistant Examiner*—Bentsu Ro
*Attorney, Agent, or Firm*—Shapiro and Shapiro

[57] ABSTRACT

A photographic camera exposes a film to an image of an object through a lens. The camera comprises means provided with a first motor for controlling the optical characteristic of the lens through the function of the first motor, means provided with a second motor for advancing the motor through the function of the second motor, and first, second and third serial circuit means each of which is provided with a pair of serially connected switching means and which are mutually connected in parallel manner. The camera further comprises first connection means for connecting the first motor between the junction of the pair of switching means in the first serial circuit means and the junction of the pair of switching means in the second serial circuit means, second connection means for connecting the second motor between the junction of the pair of switching means in the second serial circuit means and the junction of the pair of switching means in the third serial circuit means, and control means for controlling the switching means in the first, second and third serial circuit means for current supply for driving the first and second motors. The control means renders conductive one of the switching means of the first serial circuit means and one of the switching means of the second serial circuit means for driving the first motor. The control means renders conductive one of the switching means of the second serial circuit means and one of the switching means of the third serial circuit means for driving the second motor.

4 Claims, 3 Drawing Figures

CURRENT SUPPLY DEVICE FOR PLURAL LOADS

BACKGROUND OF THE INVENTION

1. Field of the Invention

The present invention relates to a device for controlling the direction of drive currents supplied to plural loads such as motors or solenoids.

2. Description of the Prior Art

Recent precision equipment such as a camera or video recorder often contains various loads such as motors or solenoids. For example, in a photographic camera, the film advance/rewind mechanism and the lens driving mechanism are often driven by respective exclusive motors. In such case, the motor performs film winding or lens advancement in forward rotation, and film rewinding or lens retraction in reverse rotation. A circuit for controlling the direction of current supplied to a motor for causing forward or reverse rotation thereof is for example disclosed in the U.S. Pat. No. 4,319,171. This circuit is provided with two serial circuits, each consisting of a pair of serially connected semiconductor switching means and both connected in parallel manner between positive and negative power supply lines, wherein a motor is connected between the junction of two switching means in one serial circuit and the corresponding junction in the other serial circuit. Since the motor consumes a relatively large amount of power in a precision equipment such as a camera, the switching means have to be relatively large in order to switch the current to the motor. In the above-mentioned camera, as my separate current direction controlling circuits are required as there are motors, and this has been a major factor hindering the compactness and cost reduction of the camera.

SUMMARY OF THE INVENTION

The object of the present invention is to provide a current supply device, which is small and inexpensive, and still capable of controlling the direction of currents to plural loads.

The above-mentioned object is achieved according to the present invention by the use of serial circuits of switching means common to plural circuits instead of conventional serial circuits of separate switching means.

DESCRIPTION OF THE PREFERRED EMBODIMENTS

Now the present invention will be clarified in detail by embodiments thereof shown in the attached drawings.

Figure 1:
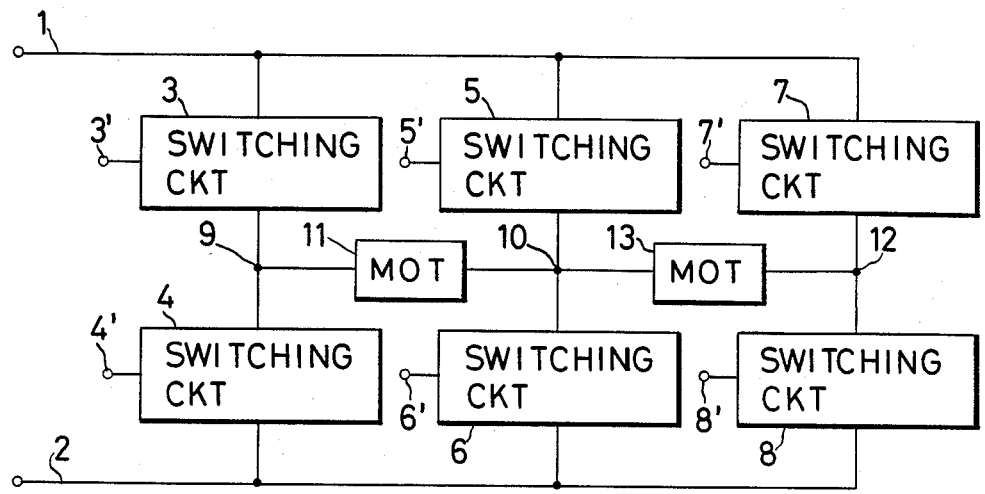
FIG. 1 is a circuit diagram showing a basic embodiment of the present invention.

Referring to FIG. 1, between a positive line 1 and a negative line 2 of a power source (not shown), there are connected, in parallel manner, a serial circuit of switching circuits 3, 4, another serial circuit of switching circuits 5, 6, and still another serial circuit of switching circuits 7, 8. The switching circuits 3–8 comprise of semiconductor switching circuits composed for example of transistors, and are rendered conductive or non-conductive respectively in response to high (H) level or low (L) level signals received at control terminals 3'–8'. A motor 11, constituting a circuit to be controlled, is connected between the junction 9 of the switching circuits 3, 4 and the junction 10 of the switching circuits 5, 6, and said junctions 9, 10 constitute first connection means. Another motor 13, constituting another circuit to be controlled, is connected between the junction 10 and the junction 12 of the switching circuits 7, 8, and said junctions 10, 12 constitute second connection means.

The direction of rotation of the motors 11, 13 is controlled by current supply through one of eight power supply paths.

A first current supply path is formed by simultaneously rendering the switching circuits 3, 6 conductive, whereby the current flows from the positive line 1 to the negative line 2 through the switching circuit 3, junction 9, motor 11, junction 10 and switching circuit 6. The motor 11 rotates in the forward direction by said current supply.

A second current supply path is formed by simultaneously rendering the switching circuits 5, 4 conductive, whereby the current flows from the positive line 1 to the negative line 2 through the switching circuit 5, junction 10, motor 11, junction 9 and switching circuit 4. The motor 11 rotates in the reverse direction by said current supply.

A third current supply path is formed by simultaneously rendering the switching circuits 5, 8 conductive, whereby the current flows from the positive line 1 to the negative line 2 through the switching circuit 5, junction 10, motor 13, junction 12 and switching circuit 8. The motor 13 rotates in the forward direction by said current supply.

A fourth current supply path is formed by simultaneously rendering the switching circuits 7, 6 conductive, whereby the current flows from the positive line 1 to the negative line 2, through the switching circuit 7, junction 12, motor 13, junction 10 and switching circuit 6. The motor 13 rotates in the reverse direction by said current supply.

A fifth current supply path is formed by simultaneously rendering the switching circuits 3, 8 conductive, whereby the current flows from the positive line 1 to the negative line 2, through the switching circuit 3, junction 9, motor 11, junction 10, motor 13, junction 12 and switching circuit 8. The motors 11, 13 simultaneously rotate in the forward direction by said current supply.

A sixth current supply path is formed by simultaneously rendering the switching circuits 7, 4 conductive, whereby the current flows from the positive line 1 to the negative line 2, through the switching circuit 7, junction 12, motor 13, junction 10, motor 11, junction 9 and switching circuit 4. The motors 11, 13 simultaneously rotates in the reverse direction by said current supply.

A seventh current supply path is formed by simultaneously rendering the switching circuits 3, 7, 6 conductive, whereby the motor 11 rotates in the forward direction by a current supply through the above-mentioned first current supply path, whereas the motor 13 rotates in the reverse direction by a current supply through the above-mentioned fourth current supply path.

An eighth current supply path is formed by simultaneously rendering the switching circuits 5, 4, 8 conductive, whereby the motor 11 rotates in the reverse direction by a current supply through the above-mentioned second current supply path, whereas the motor 13 rotates in the forward direction by a current supply through the above-mentioned third current supply path.

Figure 2:
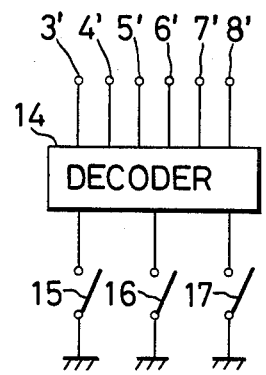
FIG. 2 is a circuit diagram of an encoder in said embodiment.

FIG. 2 shows a decoder 14 for selecting the current supply paths in the above-described control circuit, said decoder being provided with three input terminals and six output terminals. Said input terminals are respectively connected to switches 15-17 of which the other terminals are grounded, and said output terminals are respectively connected to the control terminals 3'-8' of said switching circuits 3-8. In response to the on-off states of said switches 15-17, the control terminals 3'-8' receive output signals for suitably selecting one of said eight current supply paths.

The following table summarizes the relationships of the states of said switches 15-17, the states of the control terminals 3'-8' and the selected current supply path.

TABLE

| Switch 15 | ON | ON | ON | ON | OFF | OFF | OFF | OFF |
|---|---|---|---|---|---|---|---|---|
| Switch 16 | ON | ON | OFF | OFF | ON | ON | OFF | OFF |
| Switch 17 | ON | OFF | ON | OFF | ON | OFF | ON | OFF |
| Terminal 3' | H | L | L | L | H | L | H | L |
| Terminal 4' | L | H | L | L | L | H | L | H |
| Terminal 5' | L | H | H | L | L | L | L | H |
| Terminal 6' | H | L | L | H | L | L | H | L |
| Terminal 7' | L | L | L | H | L | H | H | L |
| Terminal 8' | L | L | H | L | H | L | L | H |
| Current supply path | 1st | 2nd | 3rd | 4th | 5th | 6th | 7th | 8th |

In case all the switches 15-17 are turned on, H-level signals are supplied to the control terminals 3', 6' to activate the switching circuits 3, 6 whereby the first current supply path is selected to rotate the motor 11 in the forward direction.

In case the switch 17 alone is turned off, H-level signals are supplied to the control terminals 4', 5' to activate the switching circuits 4, 5 whereby the second current supply path is selected to rotate the motor 11 in the reverse direction.

In case the switch 16 alone is turned off, H-level signals are supplied to the control terminals 5', 8' to activate the switching circuits 5, 8 whereby the third current supply path is selected to rotate the motor 13 in the forward direction.

In case the switches 16, 17 are turned off, H-level signals are supplied to the control terminals 6', 7' to activate the switching circuits 6, 7 whereby the fourth current supply path is selected to rotate the motor 13 in the reverse direction.

In case the switch 15 alone is turned off, H-level signals are supplied to the control terminals 3', 8' to activate the switching circuits 3, 8 whereby the fifth current supply path is selected to rotate the motors 11, 13 in the forward direction.

In case the switches 15, 17 are turned off, H-level signals are supplied to the control terminals 4', 7' to activate the switching circuits 4, 7 whereby the sixth current supply path is selected to rotate the motors 11, 13 in the reverse direction.

In case the switches 15, 16 are turned off, H-level signals are supplied to the control terminals 3', 6', 7' to activate the switching circuits 4, 6, 7 whereby the seventh current supply path is selected to rotate the motor 11 in the forward direction and the motor 13 in the reverse direction.

In case all the switches 15-17 are turned off, H-level signals are supplied to the control terminals 4', 5', 8' to activate the switching circuits 4, 5, 8 whereby the eighth current supply path is selected to rotate the motor 11 in the reverse direction and the motor 13 in the forward direction.

As explained in the foregoing, the present embodiment is featured by a simpler structure since serial combinations of common switching circuits are used for both the motor 11 and the motor 13.

Figure 3:
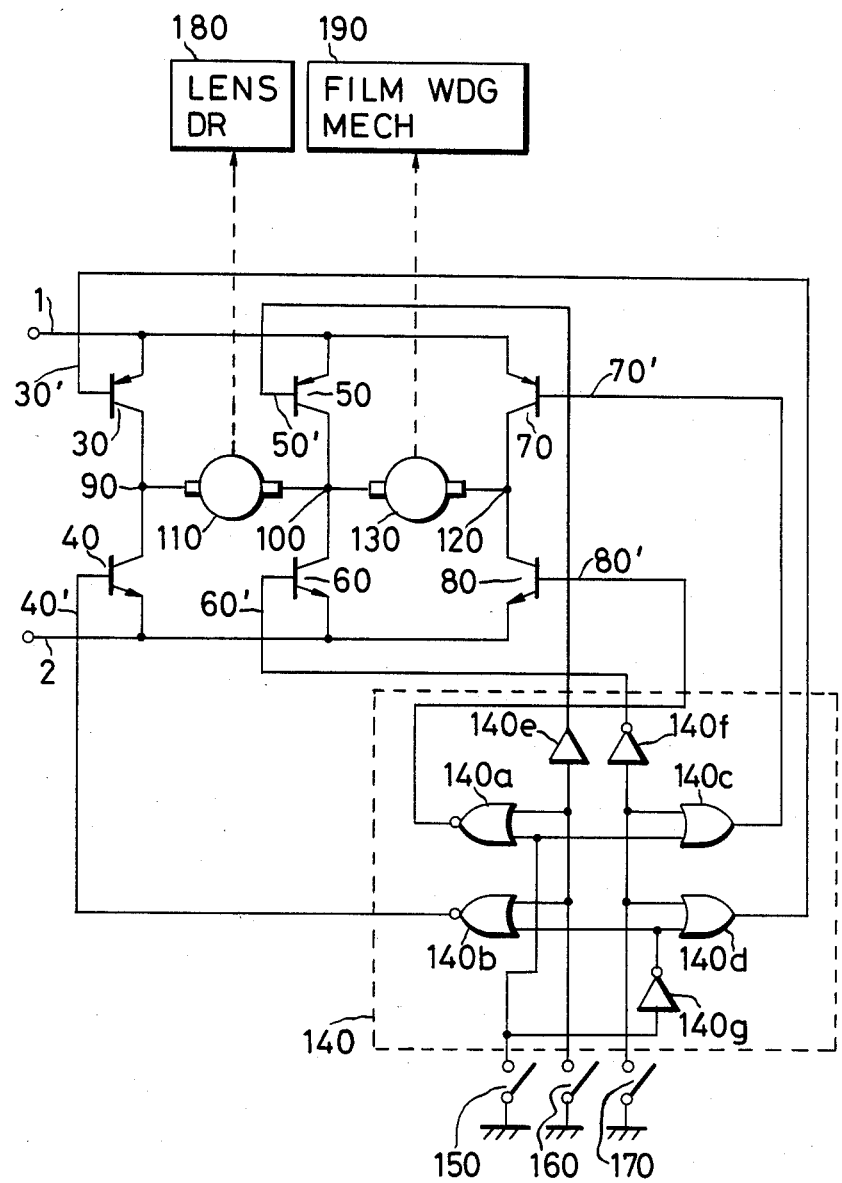
FIG. 3 is a circuit diagram showing another embodiment of the present invention.

FIG. 3 shows another embodiment applied to a photographic camera, controlled by a decoder adapted for use in case two motors need not be driven simultaneously.

In FIG. 3, between a positive power supply line 1 and a negative power supply line 2, there are connected, in parallel manner, a serial circuit of switching circuits 30, 40, another serial circuit of switching circuits 50, 60, and still another serial circuit of switching circuits 70, 80. Each of the switching circuits 30, 50, 70 is composed of a PNP transistor which is rendered conductive upon reception of an L-level signal at the base thereof constituting a control terminal. Each of the switching circuits 40, 60, 80 is composed of an NPN transistor which is rendered conductive upon reception of an H-level signal at the base thereof constituting a control terminal. A motor 110 is connected between the junction 90 of the switching circuits 30, 40 and the junction 100 of the switching circuits 50, 60, and motor 130 is connected between said junction 100 and the junction 120 of the switching circuits 70, 80. Said junctions 90, 100 constitute first connection means, while said junctions 100, 120 constitute second connection means. The motor 110 is linked to a lens driving mechanism 180 for automatic focusing or focal length selection of a camera lens, and the motor 130 is linked to a film winding mechanism 190 for winding a film from a cartridge loaded in the camera or rewinding the film into said cartridge.

The direction of rotation of the motors 110, 130 is controlled by a current supply through one of four current supply paths.

A first current supply path is formed by simultaneously rendering the switching circuits 30, 60 conductive, whereby the current flows from the positive line 1 to the negative line 2 through the switching circuit 3, junction 90, motor 110, junction 100 and switching circuit 60. The motor 110 rotates in the forward direction by said current supply.

A second current supply path is formed by simultaneously rendering the switching circuits 50, 40 conductive, whereby the current flows from the positive line 1 to the negative line 2 through the switching circuit 50, junction 100, motor 110, junction 90 and switching circuit 40. The motor 110 rotates in the reverse direction by said current supply.

A third current supply path is formed by simultaneously rendering the switching circuits 50, 80 conductive, whereby the current flows from the positive line 1 to the negative line 2 through the switching circuit 50, junction 100, motor 130, junction 120 and switching circuit 80. The motor 130 rotates in the forward direction by said current supply.

A fourth current supply path is formed by simultaneously rendering the switching circuits 70, 60 conductive, whereby the current flows from the positive line 1 to the negative line 2 through the switching circuit 70, junction 120, motor 130, junction 100 and switching circuit 60. The motor 130 rotates in the reverse direction by said current supply.

A decoder 140, indicated by broken lines, is provided with three input terminals and six output terminals. Said input terminals are respectively connected to switches 150–170, of which the other terminals are grounded, while said output terminals are respectively connected to control terminals 30'–80' of said switching circuits 30–80. The decoder 140 is composed of two NOR gates 140a, 140b; two OR gates 140c, 140d; a buffer amplifier 140e; and two inverters 140f, 140g. The switch 150 is connected to an input terminal of the NOR gate 140a, an input terminal of the OR gate 140c and to the inverter 140g. The switch 160 is connected to the other input terminal of the NOR gate 140a, an input terminal of the NOR gate 140b and the input terminal of the buffer amplifier 140e. The switch 170 is connected to the other input terminal of the OR gate 140c, an input terminal of the OR gate 140d, and the input terminal of the inverter 140f. The output terminal of the inverter 140g is connected to the other input terminal of the NOR gate 140b, and the other input terminal of the OR gate 140d. The output terminals of the NOR gates 140a, 140b are respectively connected to the control terminals 80', 40', and the output terminals of the OR gates 140c, 140d are respectively connected to the control terminals 70', 30'. Also the output terminals of the buffer amplifier 140e and of the inverter 140f are respectively connected to the control terminals 50', 60'. The switch 150 activates the motor 130 or 110, respectively when turned on or off. The switches 160, 170 select the forward or reverse rotation of the motor selected by the switch 150. For the purpose of clarity, the switches 150, 160 and 170 are illustrated as mechanical switches, but they may be composed of a microprocessor which selectively outputs H- and L-level signals according to the sequence of camera function.

In case said first current supply path is to be selected for activating the switching circuits 30, 60 to rotate the motor 110 in the forward direction, the switches 150, 160 are turned off while the switch 170 is turned on. When the switch 150 is turned off, H-level signals are supplied to input terminals of the NOR gate 140a, OR gate 140c and inverter 140g, whereby the NOR gate 140a supplies an L-level signal to the control terminal 80' to render the switching circuit 80 non-conductive, while the OR gate 140c supplies an H-level signal to the control terminal 70' to render the switching circuit 70 non-conductive. Consequently the motor 130 cannot be powered. The inverter 140g supplies an L-level signal to the other input terminal of the OR circuit 140d, so that the output thereof depends on the input signal to the first-mentioned input terminal. When the switch 160 is turned off, an H-level signal is supplied to an input terminal of the NOR gate 140b and to the buffer amplifier 140e, whereby said NOR gate 140b supplies an L-level signal to the control terminal 40' to render the switching circuit 40 non-conductive, while the buffer amplifier 140e supplies an H-level signal to the control terminal 50' to render the switching circuit 50 non-conductive. When the switch 170 is turned on, an L-level signal is supplied to an input terminal of the OR gate 140d and to the input terminal of the inverter 140f, whereby the OR gate 140d supplies an L-level signal to the control terminal 30' to render the switching circuit 30 conductive, while the inverter 140f supplies an H-level signal to the control terminal 60' to render the switching circuit 60 conductive.

In case said second current supply path is selected to activate the switching circuits 50, 40 alone to rotate the motor 110 in the reverse direction, the switches 150, 170 are turned off while the switch 160 is turned on. When the switch 150 is turned off, the switching circuits 70, 80 are rendered non-conductive as explained above, whereby the outputs of the NOR gate 140b and OR gate 140d depend on the input to the first input terminals thereof. When the switch 160 is turned on, an L-level signal is supplied to an input terminal of the NOR gate 140b and to the buffer amplifier 140e, whereby the NOR gate 140b supplies an H-level signal to the control terminal 40' to render the switching circuit 40 conductive, while the buffer amplifier 140e supplies an L-level signal to the control terminal 50' to render the switching circuit 50 conductive. When the switch 170 is turned off, an H-level signal is supplied to an input terminal of the OR gate 140d and to the input terminal of the inverter 140f, whereby the OR gate 140d supplies an H-level signal to the control terminal 30' to render the switching circuit 30 non-conductive, while the inverter 140f supplies an L-level signal to the control terminal 60' to render the switching circuit 60 non-conductive.

In case said third current supply path is selected to activate the switching circuits 50, 80 alone to rotate the motor 130 in the forward direction, the switches 150, 160 are turned on while the switch 170 is turned off. When the switch 150 is turned on, an L-level signal is supplied to input terminals of the NOR gate 140a, OR gate 140c and inverter 140g, whereby the outputs of the NOR gate 140a and OR gate 140c depend on the inputs to the other input terminals. The inverter 140g supplies an H-level signal to the other input terminals of the NOR gate 140b and OR gate 140d to obtain an L-level output signal and an H-level output signal respectively. Consequently the NOR gate 140b supplies an L-level signal to the control terminal 40' to render the switching circuit 40 non-conductive, while the OR gate 140d supplies an H-level signal to the control terminal 30' to render the switching circuit 30 non-conductive. In this manner the motor 110 cannot be powered. When the switch 160 is turned on, an L-level signal is supplied to the other input terminal of the NOR gate 140a and to the buffer amplifier 140e, whereby the NOR gate 140a supplies an H-level signal to the control terminal 80' conductive while the buffer amplifier 140e supplies an L-level signal to the control terminal 50' to render the switching circuit 50 conductive. When the switch 170 is turned off, an H-level signal is supplied to the other input terminal of the OR gate 140c and the input terminal of the inverter 140f, whereby the OR gate 140c supplies an H-level signal to the control terminal 70' to render the switching circuit 70 non-conductive, while the inverter 140f supplies an L-level signal to the control terminal 60' to render the switching circuit 60 non-conductive.

In case said fourth current supply path is selected to activate the switching circuits 70, 60 alone for rotating the motor 130 in the reverse direction, the switches 150, 170 are turned on while the switch 160 is turned off. When the switch 150 is turned on, the outputs of the NOR gate 140a and OR gate 140c become dependent on the input signals to the other input terminals, and the switching circuits 30, 40 are rendered non-conductive. When the switch 160 is turned off, an H-level signal is supplied to the other input terminal of the NOR gate 140a and the input terminal of the buffer amplifier 140e, whereby the NOR gate 140a supplies an L-level signal to the control terminal 80' to render the switching circuit 80 non-conductive, while the buffer amplifier 140e supplies an H-level signal to the control terminal 50' to render the switching circuit 50 non-conductive. When the switch 170 is turned on, an L-level signal is supplied to the other input terminal of the OR gate 140c and the input terminal of the inverter 140f, whereby the OR gate 140c supplies an L-level signal to the control terminal 70' to render the switching circuit 70 conductive, while the inverter 140f supplies an H-level signal to the control terminal 60' to render the switching circuit 60 conductive.

In order to select no current supply path to deactivate both the motors 110 and 130, the switches 160, 170 are to be turned off.

Also in order to stop the motor 110 there may be added means for rendering the transistors 40, 60 conductive as disclosed in the U.S. Pat. No. 4,319,171, and, in order to stop the motor 130 there may be added means for rendering the transistors 60, 80 conductive. Also the lens driving mechanism 180 may be replaced by a pop-up mechanism for a flash tube of an electronic flash.

In the foregoing embodiments the loads to be controlled are represented by motors, but the present invention is applicable to any other loads that change function state thereof by the current supply thereto, such as solenoids.

Each of the foregoing embodiments is provided with two loads to be controlled, but the present invention is likewise applicable to any larger number of loads, and, in such case, there are required serial circuits of switching means of a number one larger than the number of the loads to be controlled. In this manner the advantage of the current supply direction controlling circuit of the present invention becomes more enhanced as the number of the loads increases.

In the foregoing description, for the purpose of clarity, the circuit contains the minimum necessary switching means. However, the present invention also encompasses other embodiments which additionally include other circuit components such as resistors or switching means for other purposes.

We claim:
1. A device of a camera for supplying a current from a power source to a first motor for moving a member between two different positions and to a second motor for advancing a film, said device comprising:
   (a) first, second and third circuit means each of which comprises a pair of serially connected semiconductor switching means and which are connected to said power source in parallel manner;
   (b) first connection means for connecting said first motor between the junction of said pair of semiconductor switching means in said first circuit means and the junction of said pair of semiconductor switching means in said second circuit means;
   (c) second connection means for connecting said second motor between the junction of said pair of semiconductor switching means in said second circuit means and the junction of said pair of semiconductor switching means in said third circuit means; and
   (d) control means for controlling said semiconductor switching means of said first, second and third circuit means to supply a current to said first and second motors, said control means including selection means for selecting either one of said first and second motors, but not both of said motors concurrently, and conduction control means for controlling the conduction of said semiconductor switching means of said first, second and third circuit means so that a current is supplied to one of said first and second motors which is selected by said selection means, said selection means having input means for inputting three binary signals to said conduction control means in parallel, each of said three binary signals having two different levels, said conduction control means being responsive to said three binary signals for causing either one of said motors to be driven in a forward direction or in a reverse direction while the other of said motors is not driven, depending upon the levels of said three binary signals.

2. A device according to claim 1, wherein said conduction control means comprises a logic circuit having three inputs connected to said input means and six outputs connected to said semiconductor switching means, respectively, for controlling the conduction thereof, said logic circuit including component means interconnnected to provide different pairs of said outputs depending upon the levels of said three binary signals, but only one pair of outputs at a time, each pair of outputs rendering conductive a corresponding pair of said semiconductor switching means in different ones of said circuit means.

3. A device of a camera for supplying a current from a power source to a first motor for moving a member between two different positions and to a second motor for advancing a film, said device comprising:
   (a) first, second and third circuit means each of which comprises a pair of serially connected semiconductor switching means and which are connected to said power source in parallel manner;
   (b) first connection means for connecting said first motor between the junction of said pair of semiconductor switching means in said first circuit means and the junction of said pair of semicondcutor switching means in said second circuit means;
   (c) second connection means for connecting said second motor between the junction of said pair of semiconductor switching means in said second circuit means and the junction of said pair of semiconductor switching means in said third circuit means; and
   (d) control means for controlling said semiconductor switching means of said first, second and third circuit means to supply a current to said first and second motors, said control means including selection means for selecting either one of said first and second motors, but not both of said motors concurrently, and conduction control means for controlling the conduction of said semiconductor switching means of said first, second and third circuit means so that a current is supplied to one of said first and second motors which is selected by said selection means, and wherein said selection means comprises three selector switches, each of which has an on position and an off position, and wherein said conduction control means is responsive to said selector switches for causing either one of said motors to be driven in a foward direction or a reverse direction, while the other of said motors is not driven, depending upon the positions of said selector switches.

4. A device according to claim 3, wherein said conduction control means comprises a logic circuit having three inputs connected to said selector switches, respectively, and six outputs connected to said semiconductor switching means, respectively, for controlling the conduction thereof, said logic circuit including component means interconnected to provide different pairs of said outputs depending upon the positions of said selector switches, but only one pair of outputs at a time, each pair of outputs rendering conductive a corresponding pair of said semiconductor switching means in different ones of said circuit means.

* * * * *